United States Patent [19]
Charlton

[11] Patent Number: 5,929,774
[45] Date of Patent: Jul. 27, 1999

[54] COMBINATION PAGER, ORGANIZER AND RADIO

[76] Inventor: Norman J Charlton, 3395 Binbrook Rd. North, Columbus, Ohio 43227-3512

[21] Appl. No.: 08/874,385

[22] Filed: Jun. 13, 1997

[51] Int. Cl.$^6$ .................................................. H04B 7/00
[52] U.S. Cl. .................................. 340/825.44; 340/311.1; 340/825.52; 340/825.48; 455/556; 455/228; 455/90; 455/344; 364/705.05
[58] Field of Search ........................... 340/825.44, 311.1, 340/825.52, 825.48; 364/705.05; 455/556, 228, 90, 344

[56] References Cited

U.S. PATENT DOCUMENTS

| | | | |
|---|---|---|---|
| 4,306,294 | 12/1981 | Hashimoto et al. | 364/705.05 |
| 4,481,382 | 11/1984 | Villa-Real | 455/556 |

*Primary Examiner*—Michael Horabik
*Assistant Examiner*—Yves Dalencourt
*Attorney, Agent, or Firm*—Michael I. Kroll

[57] ABSTRACT

A combination electronic pager, organizer and radio (10) supplied with power by at least one of an external and an internal power supply (56) and connectable to a telephone line (50). The combination electronic pager, organizer and radio (10) includes a housing including a base unit (12) and a face unit (14). Positioned within the base unit (12) is a radio (64) for receiving an external radio transmission and including a tuning dial (36) for tuning the received transmission and a speaker (30) for producing an audio representation of the received signal. The radio (64) is connected to receive power from the at least one of the external and internal power sources (56). A microprocessor (54) including a memory (58) for storing data for use thereby and a clock (62) for indicating a present time of day, date, month and year is also positioned within the base unit (12) and is connected to receive power from the at least one of the external and internal power supplies (56). A keyboard (24) is connected to input data to the microprocessor (54) for storage in the memory (58), the data includes information relating to dates and times of appointments. A modem (60) is connected between the microprocessor (54) and the telephone line for initiating a telephone call to a predetermined telephone number upon a determination by the microprocessor (54) that a time indicated by the clock (62) matches a time associated with data stored in the memory (58) and associated with an appointment input on said keyboard (24). The microprocessor (54) is also capable of performing arithmetic calculations, store names, telephone numbers, addresses and memos and processing financial information.

5 Claims, 4 Drawing Sheets

COMBINATION PAGER, ORGANIZER AND RADIO

BACKGROUND OF THE INVENTION

1. Field of the Invention

The instant invention relates generally to electronic organizers and, more specifically, to an electronic organizer capable of paging a user and including a radio.

2. Description of the Prior Art

Numerous electronic organizer devices have been provided in the prior art. For example, U.S. Pat. Nos. 5,043,721; 5,273,651; 5,459,458 and 5,473,316 all are illustrative of such prior art While these units may be suitable for the particular purpose to which they address, they would not be as suitable for the purposes of the present invention as heretofore described.

U.S. Pat. No. 5,043,721

Inventor: Gregory J. May

Issued: Aug. 27, 1991

A paging accessory for portable computing devices such as calculators, electronic notebooks, calendars or the like. The paging accessory includes a board on which are mounted a receiver for receiving page signals and a microprocessor for identifying and decoding a page signal intended for the accessory. The board includes connectors for inserting the accessory into a port of a portable computing device. Alternatively, the receiver may be incorporated directly into a device. The device is programmed to compare information in its memory. For example, it can compare a received phone number against a list of phone numbers to identify the person to be called in response to the page.

U.S. Pat. No. 5,237,651

Inventor: Stephen Randall

Issued: Aug. 17, 1993

An electronic personal organizer that electronically displays graphics representative of pages of a loose-leaf booklet or binder arranged into various sections on a display screen, including user selectable operational modes allowing input and storage of user generated graphics, notes, addresses, messages, etc. onto the representative pages. User input to the organizer is accomplished through a stylus and an input tablet or transducer pad sensitive to pressure or position of the stylus, the organizer including a microprocessor for controlling the organizer, permanent and temporary internal memory along with external interfaces for connection with additional storage devices, printers, or other dumb or smart peripheral devices.

U.S. Pat. No. 5,459,458

Inventor: C. Patrick Richardson et al.

Issued: Oct. 17, 1995

A general-purpose data terminal, such as a personal computer, portable computer, notebook computer, personal intelligent communicator, portable wireless terminal and the like employs a radio frequency (RF) modem and is programmed to function as a two-way acknowledge back pager. The general purpose data terminal maintains a table listing of caller identification information and presents this information to the device user upon receipt of a page from an identifiable caller. The device user may respond to the page by selecting one of a plurality of user definable responses to be transmitted back to the caller. If no response is selected the caller will receive a message informing them of the paged party's unavailability.

U.S. Pat. No. 5,473,316

Inventor: Kei Takaya

Issued: Dec. 5, 1995

A radio pager having a pager body provided with a keyboard for implementing an electronic memorandum, a lid provided with a display for selectively displaying a received message or data meant for the electronic memorandum, and a hinge connecting the pager body and lid. The pager has a detecting section for detecting the opening of the lid. When the lid is opened as detected by the detecting section, an alert stopping section stops an alerting operation immediately.

SUMMARY OF THE PRESENT INVENTION

The present invention relates generally to electronic organizers and, more specifically, to an electronic organizer able to page a user and including a radio.

A primary object of the present invention is to provide an electronic organizer that will overcome the shortcomings of prior art devices.

Another object of the present invention is to provide an electronic organizer which is able to store a schedule of a user and page the user as notification of a scheduled event.

An additional object of the present invention is to provide an electronic organizer which includes a radio providing an audio sound signal while using the organizer.

A further object of the present invention is to provide an electronic organizer which is able store a plurality of telephone numbers in the fashion of a rolodex.

A yet further object of the present invention is to provide an electronic organizer which includes a modem and telephone connection port for connection with a telephone line and use in paging the user.

A still further object of the present invention is to provide an electronic organizer which includes an internal clock and alarm.

An even further object of the present invention is to provide an electronic organizer which includes a microprocessor and memory for storage of software able to assist in financial transactions and calculations.

Another object of the present invention is to provide electronic organizer that is simple and easy to use.

A still further object of the present invention is to provide an electronic organizer that is economical in cost to manufacture.

Additional objects of the present invention will appear as the description proceeds.

A combination electronic pager, organizer and radio supplied with power by at least one of an external and an internal power supply and connectable to a telephone line is disclosed by the present invention. The combination electronic pager, organizer and radio includes a housing having a base unit and a face unit. Positioned within the base unit is a radio for receiving an external radio transmission. The radio is connected to receive power from the at least one of the external and internal power sources and includes a tuning key for tuning the received transmission and a speaker for producing an audio representation of the received signal. A microprocessor including a memory for storing data for use thereby and a clock for indicating a present time of day, date, month and year is also positioned within the base unit and is connected to receive power from the at least one of the external and internal power supplies. A keyboard is connected to input data to the microprocessor for storage in the memory, the data includes information relating to dates and times of appointments. A modem is connected between the microprocessor and the telephone line for initiating a telephone call to a predetermined telephone number upon a determination by the microprocessor that a time indicated by the clock matches a time associated with data stored in the memory and associated with an appointment input on the keyboard. The microprocessor is also capable of performing arithmetic calculations; storage of names, telephone numbers, addresses and memos; and processing financial information.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
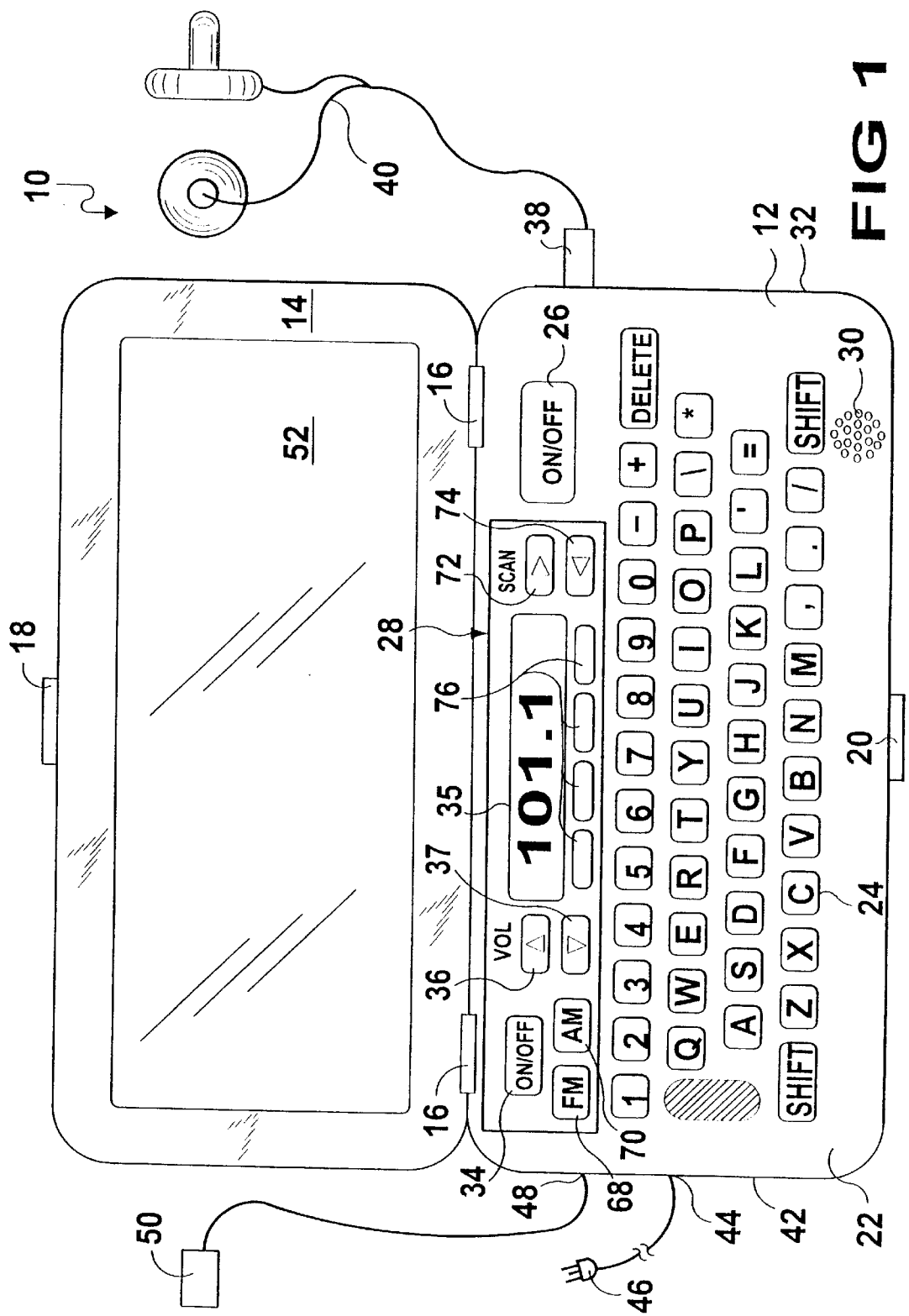
FIG. 1 is a perspective view of the electronic organizer of the present invention.
Figure 2:
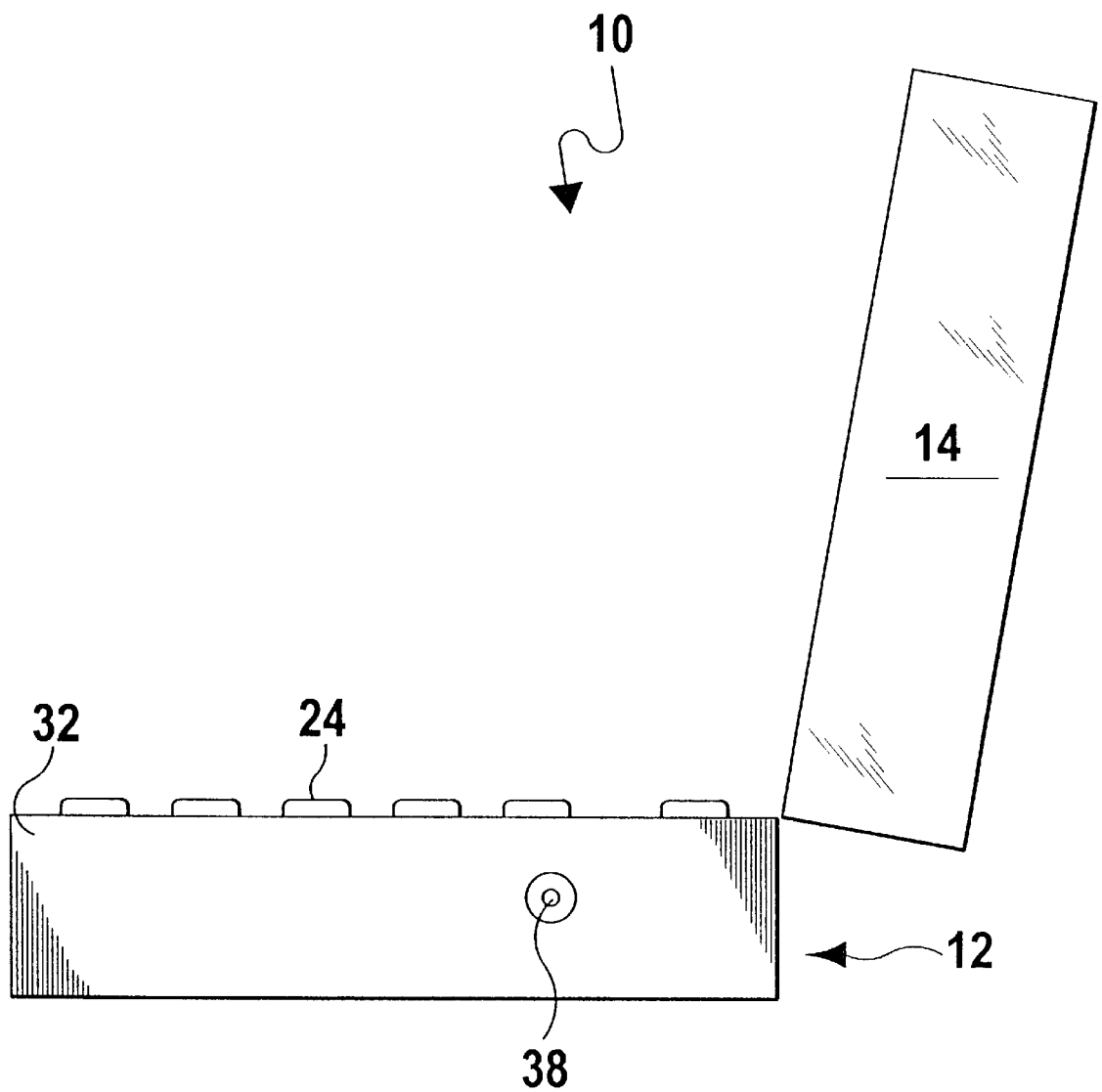
FIG. 2 is a left side view of the electronic organizer of the present invention.

Turning now descriptively to the drawings, in which similar reference characters denote similar elements throughout the several views, the Figures illustrate a combination electronic organizer, pager and radio of the present invention. With regard to the reference numerals used, the following numbering is used throughout the various drawing figures.

10 combination electronic organizer, pager and radio of the present invention
12 base unit of the combination electronic organizer, pager and radio
14 display unit of the combination electronic organizer, pager and radio
16 pivotable hinges
18 clasp
20 latch
22 face side of base unit
24 keyboard
26 power button
28 radio
30 speaker
32 right side of base unit
34 power control key
35 display face
36 volume up key
37 volume down key
38 headphone jack
40 headphones
42 left side of base unit
44 external power source connection port
46 electrical power cord
48 telephone line connection port
50 telephone cord
52 display screen
54 microprocessor
56 internal battery/power source
58 memory
60 modem
62 timer
64 radio
66 alarm
68 FM radio set key
70 AM radio set key
72 tune up key
74 tune down key
76 individual preset tune keys
78 preset memory

DETAILED DESCRIPTION OF THE PREFERRED EMBODIMENT

Turning now descriptively to the drawings, in which similar reference characters denote similar elements throughout the several views, FIGS. 1 through 4 illustrate a combination electric organizer, pager and radio indicated generally by the numeral 10.

The combination electronic organizer 10 includes a base unit 12 and a display unit 14 connected together by pivotable hinges 16. The base unit 12 includes a clasp 18 and the display unit 14 includes a lock 20. When the display unit 14 is pivoted about the pivotable hinges 16 and towards the base unit 12, the lock 20 is caused to engage the clasp 18 and thereby lock the combination electronic organizer, pager and radio 10 in a closed position. To open the combination electronic organizer, pager and radio 10 the clasp 18 must be released from the lock 20 and the display unit 14 can be pivoted away from the base unit 12.

The base unit 12 includes a face side 22 including a keyboard 24 for programming and inputting data in and a power button 26 for providing power to the combination electronic organizer, pager and radio 10. Also positioned and viewable on the face side 22 of the base unit 12 is a radio 28. The radio 28 is preferably digital and includes a power key 34 for independently turning the radio on and off. A display face 35 is viewable on the face side 22 to indicate which radio station the radio 28 is tuned. A speaker 30 for producing audio signals received by the radio 28 and for an alarm signal generated by an internal alarm is also present on the face side 22. Keys for selecting FM and AM radio stations 68 and 70, respectively, are positioned on the face side 22 along with an up tuning key 72 and a down tuning key 74 for tuning the radio 28. The radio 28 also includes a number of preset tuning select keys 76 for storing a radio stations frequency and automatically tuning the radio 28 to that station when pressed. It is to be realized that the radio is not limited to include digital controls and tuning but may also be an analog controlled radio. The radio and alarm will be discussed in further detail hereinafter.

Positioned on a right side 32 of the base unit 12 is a headphone connection port 38 for listening to the radio through headphones 40. The right side 32 of the combination electronic organizer, pager and radio 10 is clearly illustrated in FIG. 2.

Figure 3:
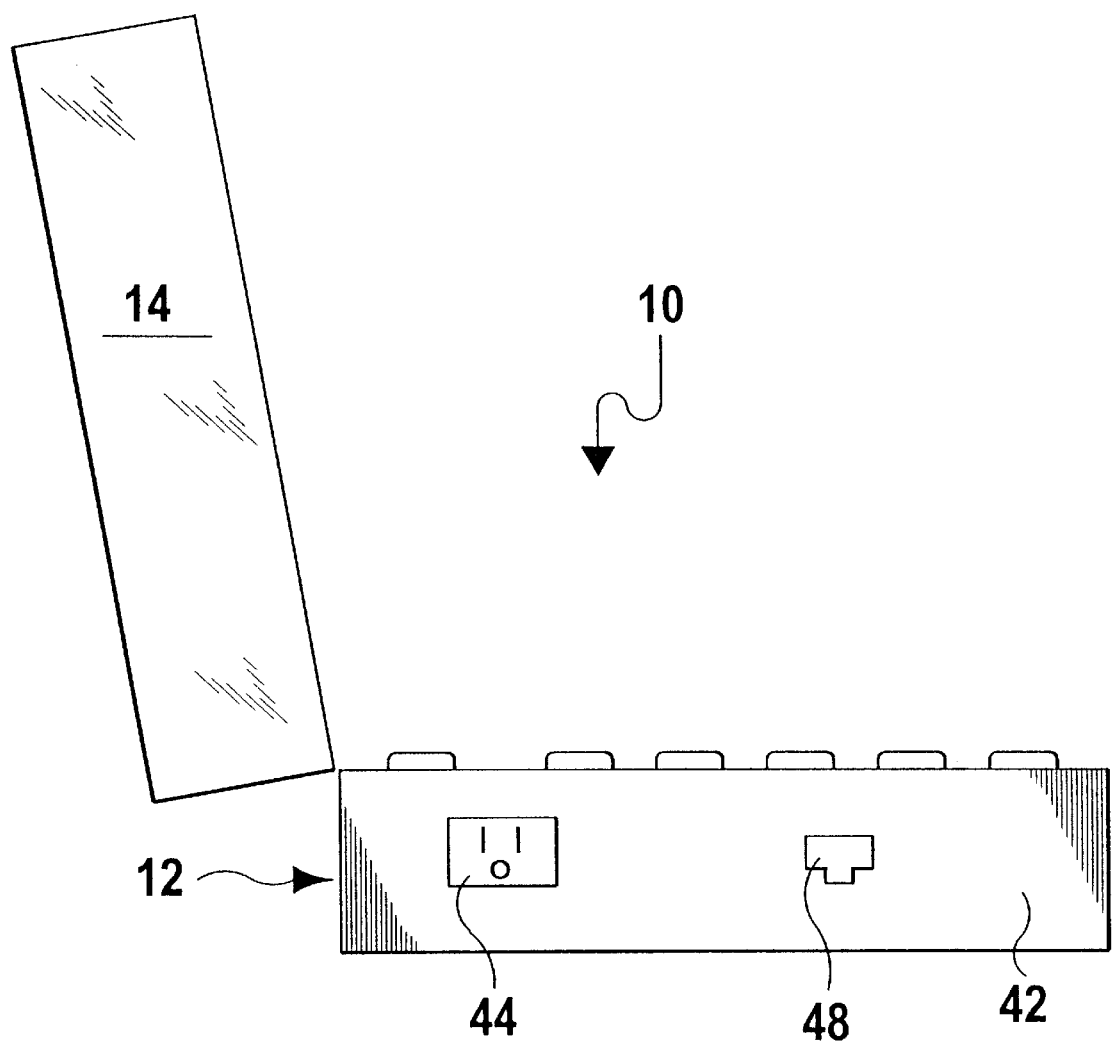
FIG. 3 is a right side view of the electronic organizer of the present invention.

A left side 42 of the combination electronic organizer, pager and radio 10 is illustrated in FIG. 3. This figure illustrates an external power source connection port 44 for connection of an electrical power cord 46 to supply power to the combination electronic organizer 10 from an external source. A telephone line connection port 48 is also positioned on the left side 42 of the base unit 12 for connection of the combination electronic organizer, pager and radio 10 to the telephone line via a telephone cord 50. It is to be realized that the position of the components on the side of the base unit 12 are for purposes of illustration only and not meant to limit the invention in any manner. In practice, any of the elements on either of the left and right sides may be positioned on the opposite side from that described without altering the functioning of the device in any way.

Positioned on the display unit 14 of the combination electronic organizer, paper pager and radio 10 is a display screen 52 as is illustrated in FIG. 1. The display screen 52 provides a visual display of any data programmed into the combination electronic organizer, pager and radio 10 and any information or data typed on the keyboard 24. By typing particular commands on the keyboard 24, the visual information displayed on the display screen 52 may be controlled in accordance with the data and software stored within the memory of the combination electronic organizer, pager and radio 10.

Figure 4:
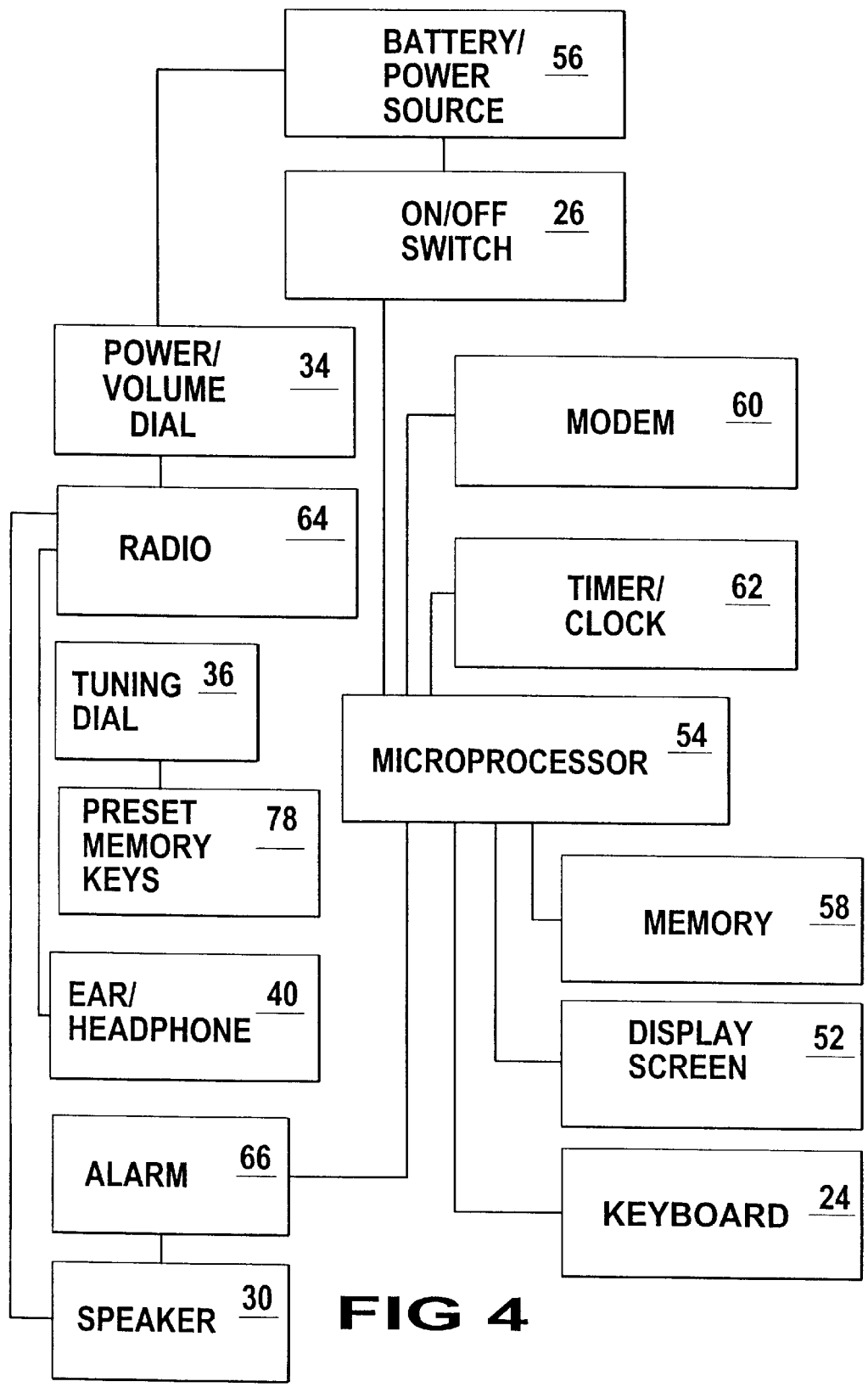
FIG. 4 is a block diagram illustrating the combination of components in the electronic organizer of the present invention.

The internal components of the combination electronic organizer, pager and radio 10 will now be described with specific reference to the block diagram of FIG. 4. A programmable microprocessor 54 is positioned within the base unit 12 and is connected to both an internal battery 56 and the external power source connection port 44 for receiving power from an optional external power source connected to the combination electronic organizer 10 through the external power source connection port 44. The power switch 26 positioned on the face side 22 of the base unit 12 is connected between the programmable microprocessor 54 and the internal and external power source 56. The keyboard 24 and display screen 52 are also connected to the programmable microprocessor 54 along with an internal memory 58 for storage of data input to the programmable microprocessor 54.

A timer/clock 62 and an alarm 66 are also connected to the programmable microprocessor 54. The timer/clock 62 monitors the present time, day and date and communicates this information to the programmable microprocessor 54. The alarm 66 is controlled by the programmable microprocessor 54 to produce an audio signal upon a determination that a predetermined or previously set time, day and date has been reached. The programmable microprocessor 54 is programmed to store data representative of appointments which are input thereto through the depressing of keys on the keyboard 24.

A modem 60 is connected between the programmable microprocessor 54 and the telephone line connection port 48 for connection to the telephone line for placing a telephone call to page the user upon determining by the programmable microprocessor 54 that a time, day and date representative of a programmed appointment has been reached and thereby inform the user of the appointment. Software programs for independently dialing a telephone number by a modem are well known and any of such software programs may be stored in the memory 58 and accessed for use by the programmable microprocessor 54.

A radio 64 is also positioned within the base unit 12 and is connected to the power source 56 via the power/volume control dial 34. The radio 64 is also connected to the speaker 30 and a headphone jack 40 for supplying a received signal through either the speaker 30 or a headphone 40 connected to the headphone connection port 38 so a user may listen to the received signal. The radio 64 is also connected to the tuning key 36 for tuning in a desired signal transmitted from a remote source. Connected to the tuning key 36 is a preset memory 78 which stores a select number of tuning frequencies and when activated automatically tunes the radio to the desired frequency.

In operation, the combination electronic organizer 10 is able to store a large amount of data representative of appointment times of a user along with memoranda related to the appointment data. The memory unit 58 is also able to store telephone number and address data for important contacts or frequently contacted parties for the user. The software programs for performing such functions is well known in the art and any such software programs may be stored in the memory unit for access and use by the programmable microprocessor 54. Any data desired to be stored in the memory unit 58 must be input using the keyboard 24. The memory unit 58 has a storage capacity large enough to store the above and a sufficient amount of additional data to properly operate and perform its intended functions. The memory unit 58 is also expandable and additional storage space may be added as needed. The timer/clock 62 is accessed by the programmable microprocessor 54 for comparison with any stored data representative of appointments in order to determine whether the user needs to be alerted as to an approaching appointment time. Notification of an appointment can be accomplished by either production of an audio signal to be sounded through the speaker 30 by the alarm 66 or by paging the user at a preset telephone number through the modem connection to the telephone line. The software for automatically initiating a telephone call through the modem 60 is well known and any such software for accomplishing this task may be stored in the memory unit 58.

The radio 64 may be used at any time independently from the use of the organizer or paging functions by turning the power/volume switch 34 to the on position. The signals received by the radio 64 are audible through the speaker 30 and a headset 40 connected to the radio via the headset connection port 38. The audible signal produced by the alarm 66 will override any signal produced by the radio 64 and thus may be heard over the radio signal.

From the above description it can be seen that the combination electronic organizer of the present invention is able to overcome the shortcomings of prior art devices by providing an electronic organizer which is able to store a schedule of a user and page the user thereby notifying the user that a scheduled event or appointment time is approaching. The electronic organizer of the present invention includes a radio providing an audio sound signal while using the organizer, a modem and telephone connection port for connection with a telephone line and use in paging the user and an internal clock and alarm. The electronic organizer also includes a microprocessor and memory for storage of a plurality of telephone numbers in the fashion of a rolodex and software able to assist in financial transactions and calculations. Furthermore, the combination electronic organizer of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A combination electronic pager, organizer and radio supplied with power by at least one of an external and an internal power supply and connectable to a telephone line, said combination electronic pager, organizer and radio comprising:

a) a housing including a base unit and a display unit;

b) a radio positioned within said base unit for receiving an external radio transmission including a tuning dial for tuning said received transmission and a speaker for producing an audio representation of said received signal, said radio being connected to receive power from the at least one of the external and internal power sources, said radio further including a headphone connection port and a pair of headphones connected to said radio through said headphone connection port for providing an audio representation of said received signal to a user through said headphones and further comprising a power dial for connecting and disconnecting the at least one of the external and internal power supplies to said radio and controlling a volume of said produced audio signal;

c) a programmable microprocessor including a memory for storing data for use by said microprocessor and a clock for indicating a present time of day, date, month and year, said microprocessor being positioned within said base unit and connected to receive power from the at least one of the external and internal power supplies, and said radio and microprocessor operating independently of each other;

d) a keyboard connected to input data to said microprocessor for storage in said memory, said data including information relating to dates and times of appointments;

e) a modem connected between said microprocessor and the telephone line for initiating a telephone call to a predetermined telephone number upon a determination by said microprocessor that a time indicated by said clock matches a time associated with data stored in said memory and associated with an appointment input on said keyboard, said programmable microprocessor providing notification of an appointment by producing an audio signal to be sounded through said speaker if the user is present or paging the user at a preset telephone number through said modem connected to a telephone line if the user is not present, said audio signal being sounded through said speaker overriding any signal being produced by said radio;

f) a display screen positioned on said display unit and connected to said microprocessor for visually displaying data input to said microprocessor through said keyboard; and g) a power switch connected between the at least one of the external and internal power sources and said microprocessor, said power switch being operable between a first position preventing power from flowing to said microprocessor and a second position providing power to said microprocessor.

2. The combination electronic pager, organizer and radio as recited in claim 1, wherein said base unit and said display unit are pivotally connected together by at least one pivotable hinge.

3. The combination electronic pager, organizer and radio as recited in claim 1, further comprising means for performing financial and mathematical calculations stored within said memory.

4. The combination electronic pager, organizer and radio as recited in claim 1, further comprising means for storing and retrieving data representative of telephone numbers and addresses in said memory.

5. The combination electronic pager, organizer and radio as recited in claim 1, wherein said radio further includes a tuning dial extending from said base unit for manually tuning the radio to receive a selected signal.

* * * * *